United States Patent
Lappan et al.

(10) Patent No.: US 9,334,978 B2
(45) Date of Patent: May 10, 2016

(54) VALVE DEVICE FOR A HYDRAULIC CIRCUIT, AND OIL-PUMP REGULATING ARRANGEMENT

(75) Inventors: Rolf Lappan, Cologne (DE); Werner Buse, Kaarst (DE); Christoph Sadowski, Bochum (DE); Lukas Romanowski, Osnabrueck (DE)

(73) Assignee: PIERBURG GMBH, Neuss (DE)

( * ) Notice: Subject to any disclaimer, the term of this patent is extended or adjusted under 35 U.S.C. 154(b) by 83 days.

(21) Appl. No.: 14/357,216

(22) PCT Filed: Aug. 21, 2012

(86) PCT No.: PCT/EP2012/066260
§ 371 (c)(1),
(2), (4) Date: May 9, 2014

(87) PCT Pub. No.: WO2013/068142
PCT Pub. Date: May 16, 2013

(65) Prior Publication Data
US 2014/0326911 A1    Nov. 6, 2014

(30) Foreign Application Priority Data
Nov. 11, 2011  (DE) .......................... 10 2011 055 281

(51) Int. Cl.
*F16K 31/06*    (2006.01)
*F01M 1/16*    (2006.01)
(Continued)

(52) U.S. Cl.
CPC .............. *F16K 31/0668* (2013.01); *F01M 1/16* (2013.01); *F04C 2/3442* (2013.01); *F04C 14/223* (2013.01); *F16K 31/0658* (2013.01); *F16K 31/0693* (2013.01); *F01M 2001/0238* (2013.01)

(58) Field of Classification Search
CPC ............ F16K 31/0658; F16K 31/0668; F16K 31/0693; F16K 31/0675; F16K 39/022; F16K 47/08; F01M 1/16; Y10T 137/86622; Y10T 137/86702
USPC ............. 251/50, 129.07, 129.18; 137/625.65, 137/625.68
See application file for complete search history.

(56) References Cited

U.S. PATENT DOCUMENTS 4,119,294 A * 10/1978 Schnorrenberg ....... G05D 16/10
                                                    137/505.18
4,535,816 A *  8/1985 Feder .................. F16H 61/0251
                                                    137/625.65
(Continued)

FOREIGN PATENT DOCUMENTS

CN        201321969 Y     10/2009
DE    11 2008 000 978 T5   6/2010
(Continued)

Primary Examiner — Matthew W Jellett
(74) Attorney, Agent, or Firm — Norman B. Thot

(57) ABSTRACT

A valve device for a hydraulic circuit includes an actuator unit, a valve unit and an opening. The actuator unit comprises an electromagnetic circuit comprising a movable armature, a core, a coil configured to be supplied with a current and a flux guiding means, and a space arranged in a valve interior between the armature and the core. The valve unit comprises an outlet, an inlet arranged between the outlet and the space in the valve interior, a valve seat arranged between the inlet and the outlet, and a valve closing body connected with the armature. The valve closing body is spring-loaded towards the valve seat. The opening is arranged at an end of the valve unit opposite to the space. The opening comprises a valve tappet arranged therein. The valve tappet is pressure-loaded and displaceable counter to the valve closing body in an opening direction.

15 Claims, 1 Drawing Sheet

(51) Int. Cl.
*F04C 2/344* (2006.01)
*F04C 14/22* (2006.01)
*F01M 1/02* (2006.01)

(56) References Cited

U.S. PATENT DOCUMENTS

| | | | | |
|---|---|---|---|---|
| 4,579,145 | A * | 4/1986 | Leiber | F16H 61/0251 137/312 |
| 4,662,605 | A * | 5/1987 | Garcia | F16K 31/0613 137/14 |
| 5,163,477 | A | 11/1992 | Takano et al. | |
| 5,535,783 | A * | 7/1996 | Asou | F16K 31/0693 137/625.27 |
| 5,785,299 | A * | 7/1998 | Katsuta | F16K 31/0627 137/271 |
| 5,853,028 | A * | 12/1998 | Ness | G05D 16/2013 137/625.65 |
| 6,435,213 | B2 * | 8/2002 | Lou | F16K 31/0613 137/625.65 |
| 7,766,042 | B2 * | 8/2010 | Tabor | F15B 13/0402 137/625.25 |
| 7,823,602 | B2 * | 11/2010 | Muller | F16K 31/1245 137/102 |
| 8,006,719 | B2 * | 8/2011 | Nordstrom | F16K 31/0613 137/625.68 |
| 2006/0225797 | A1 * | 10/2006 | Armiroli | F02M 59/366 137/625.65 |
| 2007/0176720 | A1 * | 8/2007 | Janssen | H01F 7/1607 335/270 |
| 2010/0139611 | A1 | 6/2010 | Hunter | |
| 2011/0168276 | A1 * | 7/2011 | Kira | F01L 1/344 137/343 |

FOREIGN PATENT DOCUMENTS

| | | |
|---|---|---|
| EP | 0 451 272 A1 | 10/1991 |
| JP | 62-248812 A | 10/1987 |
| JP | 2009-222035 A | 10/2009 |
| JP | 2011-122651 A | 6/2011 |
| WO | WO 2010/071151 * | 6/2010 ............. F16K 27/04 |

* cited by examiner

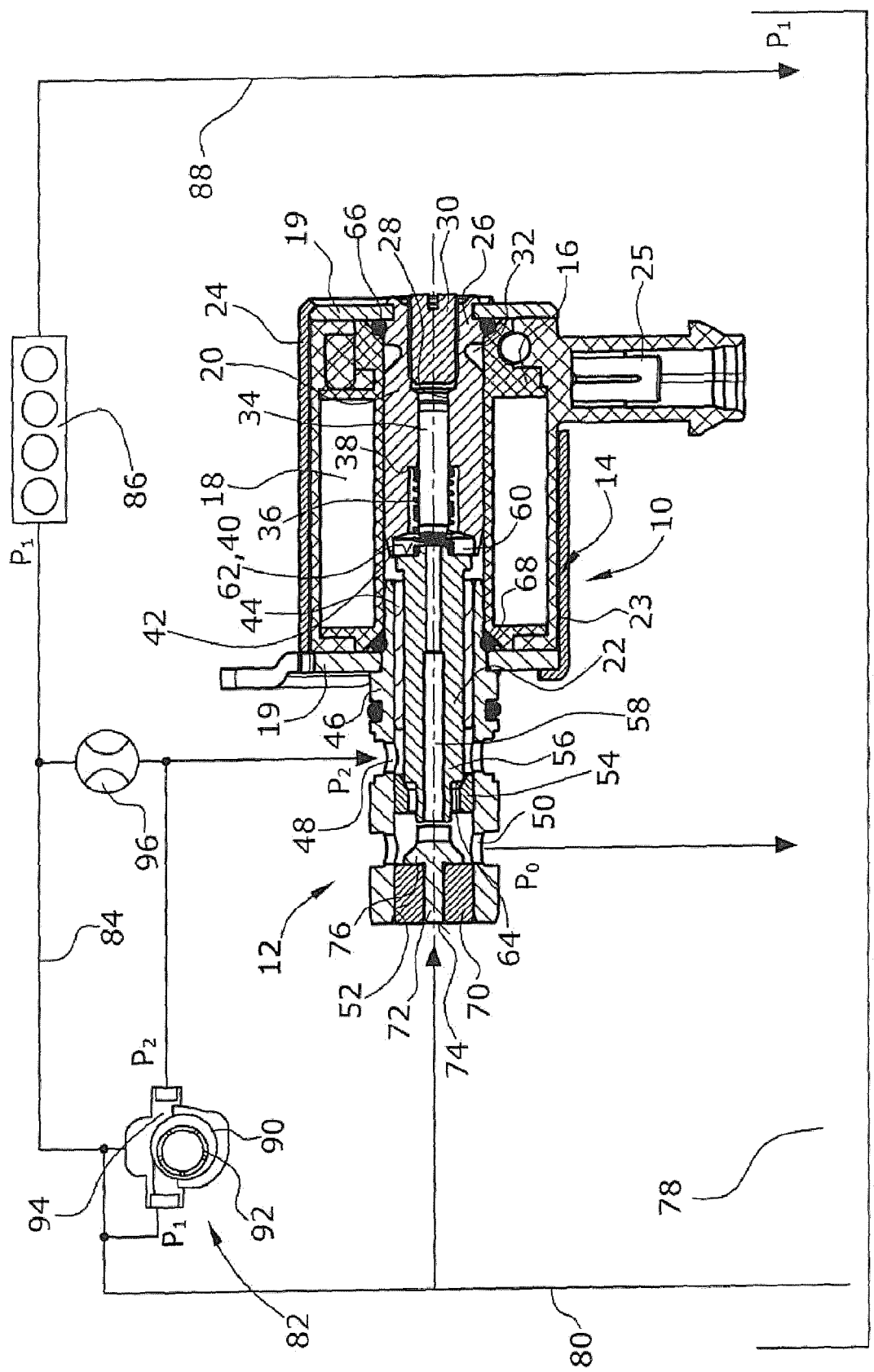

VALVE DEVICE FOR A HYDRAULIC CIRCUIT, AND OIL-PUMP REGULATING ARRANGEMENT

CROSS REFERENCE TO PRIOR APPLICATIONS

This application is a U.S. National Phase application under 35 U.S.C. §371 of International Application No. PCT/EP2012/066260, filed on Aug. 21, 2012 and which claims benefit to German Patent Application No. 10 2011 055 281.2, filed on Nov. 11, 2011. The International Application was published in German on May 16, 2013 as WO 2013/068142 A1 under PCT Article 21(2).

FIELD

The present invention relates to a valve device for a hydraulic circuit comprising an actuator unit including an electromagnetic circuit having a movable armature, a core, a coil which can be supplied with current and flux guiding devices and a space in the valve interior between the armature and the core, and a valve unit having an inlet, an outlet and a valve closing body which is connected to the armature and is spring-loaded in the direction of a valve seat, wherein the valve seat is arranged between the inlet and the outlet, as well as an oil pump regulating arrangement comprising such a valve device, a variable oil pump including a control chamber and an oil sump.

BACKGROUND

Such valve devices serve to control pressure of hydraulic controllers, for example, in control units for automatic gearboxes or for regulating the pressure in a control chamber of a variable oil pump of an oil circuit for lubricating an internal combustion engine of a vehicle. Via the pressure in the control chamber, a ring of a feed chamber, on which the rotor of a rotary vane pump or a gear pump rolls, is displaced or turned, thereby changing the volumetric capacity.

The pressure regulating valves used for these purposes comprise, for example, an electromagnetic valve which is connected via a lateral connection with a storage tank and whose lower connection is connected via an orifice to the outlet of a hydraulic fluid source. A pressure connection of a consumer to be regulated is arranged between the valve and the fluid source, wherein the pressure is adapted to be adjusted depending on the position of the electromagnet and thus the valve closing element.

A similar pressure control valve is described in EP 0451 272 A1. This valve comprises a lateral pressure connection and a lateral outlet to the storage tank as well as a lower regulating pressure connection. Depending on the position of the valve element, a free cross section of different size from the pressure connection to the outlet or to the regulating pressure connection exists, via which the pressure at the regulating pressure connection can be adjusted.

DE 11 2008 000 978 T5 describes a system for controlling the pressure in two control chambers of an oil pump using an electromagnetic valve and a spring-loaded slider member, wherein, depending on the feed pressure and the position of the electromagnetic valve, the differential pressure between the two control chambers is changed. This system additionally comprises a pressure relief valve via which the oil can be returned from the discharge side of the pump to the suction side in the case of excessive feed pressure.

These known valves and systems are disadvantageous in that the functions of overpressure switch-off and pressure regulation are performed in different components, and the free cross section allowing a flow-through, and thus the flow at the valve and the velocity and possible pressure adjustment amplitude of the pressure regulation, are relatively small. In pressure regulating valves, the required armature opening force in particular depends on the magnitude of the overpressure.

SUMMARY

An aspect of the present invention is to provide a valve device where the functions of opening in the case of overpressure and pressure regulation are combined in a valve device, wherein the valve device is adapted to be operated largely independent of the required overpressure with equal actuating forces and thus electromagnets in order to prevent additional costs. An additional aspect of the present invention is to provide an oil pump regulating arrangement which requires few components and which is inexpensive to manufacture.

In an embodiment, the present invention provides a valve device for a hydraulic circuit which includes an actuator unit, a valve unit and an opening. The actuator unit comprises an electromagnetic circuit comprising an armature configured to be movable, a core, a coil configured to be supplied with a current and a flux guiding means, and a space arranged in a valve interior between the armature and the core. The valve unit comprises an outlet, an inlet arranged between the outlet and the space in the valve interior, a valve seat arranged between the inlet and the outlet, and a valve closing body connected with the armature. The valve closing body is configured so as to be spring-loaded towards the valve seat. The opening is arranged at an end of the valve unit opposite to the space. The opening comprises a valve tappet arranged therein. The valve tappet is configured to be pressure-loaded and displaceable counter to the valve closing body in an opening direction.

BRIEF DESCRIPTION OF THE DRAWING

The present invention is described in greater detail below on the basis of embodiments and of the drawing in which:

FIG. 1 shows a sectional side view of a valve device according to the present invention which schematically illustrates a connection to an oil circuit of an internal combustion engine.

DETAILED DESCRIPTION

Due to the fact that the inlet is arranged between the outlet and the space in the valve interior and an opening is defined at the end of the valve unit opposite the room, in which opening a spring-loaded valve tappet is arranged, which is adapted to be displaced counter to the valve closing body in the opening direction, a valve device is provided where the upper valve seat is operated via the valve tappet for regulating purposes and thus an overpressure in the fluid circuit can be reduced via a magnetic force in addition to an infinitely variable regulation. The acting point of the overpressure valve is independent of the flow cross section when the valve is open. The operating force of the electromagnet is additionally independent of the cross section of the valve tappet and thus the selected overpressure.

Due to the fact that in the oil pump regulating arrangement according to the present invention such a valve device is used and the feed pressure of the variable oil pump is applied to the displaceable valve tappet, the overpressure acting point of an oil pump can be changed, according to use, via the diameter independent of the electromagnet used. The oil pump is infinitely variable via the magnetic force and an overpressure in the system can be prevented.

In an embodiment of the present invention, the space in the valve interior can, for example, be in fluid communication with the outlet, wherein a force application surface at the valve closing body, to which the pressure at the outlet is applied, corresponds to an opposite resultant force application surface at the armature, to which the pressure in the space in the valve interior is applied. A force-balanced valve is thus created which is adapted to be opened with equal operating forces independent of the system pressure.

In an embodiment of the present invention, the armature can, for example, be integrally formed with the valve closing body. This reduces the number of components and provides for the actuation of the valve closing body together with the armature.

The armature and the valve closing body comprise a longitudinal bore via which the space in the valve interior is in fluid communication with the outlet. The pressure balance can in this manner be attained at the armature and/or the valve closing body.

In an embodiment of the present invention, the valve tappet can, for example, be integrally formed with the valve closing body. The assembly is thus simplified due to the reduction of the number of components of the valve.

It can be advantageous to define an opening between the valve tappet and the valve closing body via which opening the longitudinal bore is in fluid communication with the outlet so that a pressure balance can be continued to be provided, whereby a fixed opening cross section can be associated with each operating force and thus a lift adjustment is allowed which is independent of the pressure at the inlet.

In an embodiment of the present invention, the valve tappet can, for example, be supported as a separate component in the valve unit. The free cross section of the valve device can thus be considerably increased between the inlet and the outlet. The provision of further transverse bores is omitted.

It can be advantageous when the valve tappet is guided in a bushing which is fastened in the opening of the valve unit since frictional forces can be prevented and installation of the tappet is simplified.

In an embodiment of the present invention, the valve tappet can, for example, comprise an extended portion at its end opposite the pressure-loaded surface, the extended portion, in its pressure-relieved condition, axially bearing upon the bushing, whereby the valve tappet is protected against dropping-out.

A particularly good sealing in the closed condition of the valve is attained when the valve seat in a housing of the valve unit is of frustoconical configuration and the valve closing body is of cylindrical configuration.

Decrease of the operating forces by reduction of friction is attained when the armature slides in a bushing which is arranged in the housing of the valve unit.

In an embodiment of the present invention, the core can, for example, comprise a radially outer portion which is provided with a thread, where a radially inner portion of the core is arranged so that is can be turned via the thread and is thus axially displaceable. The pattern of the magnetic field lines can thereby be changed.

In an embodiment of the oil pump regulating arrangement of the present invention, the inlet of the valve unit can, for example, be in fluid communication with the control chamber of the variable oil pump and, via an orifice, with a feed line of the oil pump. The outlet of the valve unit can, for example, be in fluid communication with the oil sump. This connection allows for a good regulation of a pressure in the control chamber of a variable oil pump, via which pressure the volumetric capacity of the oil pump can be adjusted by displacing or turning an outer adjusting ring.

A valve device is thus provided which combines the functions of a pressure relief valve and a pressure regulating valve and can yet be operated with a constant magnetic force independent of the desired overpressure to be adjusted. Large flow cross sections allow for a very rapid regulation. A change in the pressure regulation section can be effected by changing the spring characteristic. Regulation of the oil pump with a rapid adaptation to the oil quantity to be fed can thus be carried out, wherein, in addition, a fail-safe function is provided.

An embodiment of a valve device according to the present invention and the associated oil pump regulating arrangement is shown in FIG. 1 and will be described hereinafter.

The valve device according to the present invention shown in the FIG. 1 comprises an actuator unit 10 which is fastened to a valve unit 12. The actuator unit 10 comprises an electromagnetic circuit 14 including a coil 18 wound to a coil carrier 16, a core 20 in the interior of the coil carrier 16, an axially displaceable armature 22 and flux guiding means completing the electromagnetic circuit 14 and being arranged axially above and below the coil 18 in the form of reflux metal sheets 19 and radially surrounding the core 18 and/or the armature 22 in the form of a yoke 24. The coil 18 is surrounded by a plastic jacket 23 which comprises a plug 25 for supplying the coil 18 with electricity.

The core 20 comprises a radially outer portion 26 fixedly arranged in the coil carrier 16, in which outer portion 26 a through hole 28 is defined which is partly provided with an internal thread into which a radially inner portion/screw 30 with an outer thread is screwed in the form of a grub screw. Depending on the axial position of this screw 30 in the core 20, a fine adjustment of the magnetic field lines is possible. The core 20 comprises a circumferential recess 32 disposed axially at the level of the screw 30, said circumferential recess 32 preventing scattering of the magnetic field lines in the core 20, thus improving a fine adjustment via the screw 30.

A journal 34 is additionally fastened in the through hole 28 at the side of the through hole 28 facing the valve unit 12, the journal 34 serving to guide a coil spring 36 which surrounds the journal 34 and is clamped between a bearing surface 38 in the core 20 and a bearing surface 40 at the armature 22. The journal 34 further serves as a stop for limiting movement of the armature.

When the coil 18 is supplied with current, a magnetic pull is produced in a known manner between the armature 22 and the core 20 which comprises an annular tapered projection 42 for combining the axially extending magnetic field lines, the armature 22 penetrating the interior of the projection 42 when current is supplied to the coil 18.

The armature 22 is guided in a bushing 44 which is arranged in a housing 46 of the valve unit 12 in which a radial inlet 48, a radial outlet 50 and an axial opening 52 disposed at an end opposite the armature 22 are defined.

Between the inlet 48 and the outlet 50, which is arranged between the inlet 48 and the opening 52, a frustoconical valve seat 54 is defined in the housing 46, the valve seat 54 cooperating with a cylindrical valve closing body 56 which is integrally formed with the armature 22. In the armature 22 and the valve closing body 56 a longitudinal bore 58 is defined via which a space 60 in the valve interior, in which the coil spring 36 is arranged, is in permanent communication with the outlet 50 of the valve. The pressure acting on the valve closing body 56 in the opening direction is accordingly equal to the pressure acting on the armature 22 in the closing direction of the valve. Since the two force application surfaces 62, 64 are also equally large at the armature 22 and the valve closing body 56, respectively, there is a force balance at the unit composed of the movable armature 22 and the valve closing body 56, and consequently, merely the electromagnetic force and the spring force act upon this unit 22, 56.

The space 60 is sealed by two O-rings 66, 68 which are arranged radially inside the coil carrier 16 between the coil carrier 16 and the core 20 and/or between the coil carrier 16 and the housing 46 of the valve unit 12.

Another bushing 70 is additionally arranged in the opening 52 of the housing 46, in which bushing a valve tappet 72 is slidably supported, said valve tappet 72 being configured as a separate component in the present embodiment, but which could also be formed integrally with the valve closing body 64. Depending on the desired opening force, the bushing 70 has a differently large opening such that a pressure-loaded surface 74 of the valve tappet 72 may be of a correspondingly different size. The larger the surface 74, the larger is the force acting upon the valve tappet 72 at equal pressure, the valve tappet 72 thus being displaced towards the valve closing body 64 so as to possibly lift the latter off the valve seat 54. At its end opposite the pressure-loaded surface 74, the valve tappet 72 comprises an extended portion 76 which, in the no-load condition, bears upon the bushing 70 and which axially extends until it directly bears upon the valve closing body 64.

The function of this valve device for oil pump regulation purposes is hereinafter explained on the basis of the oil circuit of an internal combustion engine.

The oil circuit comprises an oil sump 78 from which oil is taken in by means of a variable oil pump 82 via a suction line 80. This oil flows to an internal combustion engine 86 via a feed line 84 for lubricating purposes and from the former back to the oil sump 78 via a return line 88.

As mentioned before, this is not an oil pump 82 which constantly feeds the same volume flow but a pump which is adjustable in terms of volume flow and thus feed pressure $p_1$ by adjusting an eccentric ring 90, in which a pump rotor 92 is eccentrically rotated for feeding purposes.

Adjustment of the eccentric ring 90 is effected by regulating a control pressure $p_2$ in a control chamber 94 of the oil pump 82. The control pressure $p_2$ acting in the control chamber 94 is regulated by means of the valve device by connecting the inlet 48 of the valve device via a nozzle or orifice 96 with the feed line 84 and with the control chamber 94 such that behind the orifice 96 at the inlet 48 of the valve and in the control chamber 94 a constant pressure $p_2$ prevails. At the opposite side of the eccentric ring 90, the feed pressure $p_1$ of the oil pump 82 acts. The outlet 50 of the valve is connected to the oil sump 78. The feed pressure $p_1$ is additionally applied to the pressure-loaded surface 74 of the valve tappet 72.

When no current is supplied to the valve, the armature 22, and thus the valve closing body 56, is pressed to the valve seat 54 by the spring force. There is accordingly no connection between the inlet 48 and the outlet 50. There is thus a maximum control pressure $p_2$ which acts in the control chamber and causes the eccentric ring 90 to be in its maximum position and thus the feed pressure $p_1$ to be a maximum pressure.

Besides the spring force, a force resulting from the feed pressure $p_1$ and the pressure-loaded surface 74 to which said feed pressure $p_1$ is applied acts on the armature 22 via the valve tappet 72. If this force is smaller than the spring force, oil is continued to be fed at the maximum pressure $p_1$.

If, however, this force exceeds the spring force, the valve closing body 56 is lifted by the valve tappet 72 off the valve seat 54 so that a connection from the inlet 48 to the outlet 50 is established which results in a reduction of the control pressure $p_2$ and thus, by displacing the eccentric ring 90, in a reduction of the feed pressure $p_1$. A maximum pressure in the system can thus be adjusted in a simple manner via the surface upon which the feed pressure acts. A fail-safe function is at the same time provided in the case of failure of the actuator unit 10.

If a reduction of the feed pressure $p_1$ is desired, the control unit supplies the coil 18 with a voltage. The armature 22 is consequently pulled towards the core 20 so that the valve closing body 56 is lifted off the valve seat 54 and a connection between the inlet 48 and the outlet 50 is established which, in turn, results in a reduction of the control pressure $p_2$ in the control chamber 94 and thus in reduction of the feed pressure $p_1$. The opening cross section depends on the current supply of the coil 18 so that with increasing current supply, the free cross section increases, and thus the feed pressure $p_1$ decreases.

If a rotational speed jump of the pump 82 occurs, for example, due to a sudden load increase of the internal combustion engine 86, the feed pressure $p_1$ temporarily increases which results in the valve tappet 72 being pressed counter to the valve closing body 56 whereby, in turn, the fluid communication between the inlet 48 and the outlet 50 is established. This takes place in a very short period of time since the cross section area through which the flow can pass in this valve can be selected as a very large cross section area. The control pressure $p_2$ and thus the feed pressure $p_1$ hence decrease until the feed pressure $p_1$ suitable for supplying the electromagnet with current is reached again.

A feed pressure can consequently be associated with each current supply and thus each magnetic force. The opening force to be applied is accordingly merely dependent on the spring force and is independent of the control pressure. Regulation of the overpressure cut-off force can be effected in a simple manner via the pressure-loaded surface of the pressure tappet, and a change in the regulating pressure by changing the spring force characteristic. The same coils can thus be used for different pressure regulating and overpressure areas, which leads to a reduction of the manufacturing costs.

It is apparent that these valve devices are also suitable for other hydraulic circuits. Design changes of the valve device as compared with the illustrated exemplary embodiment, such as, for example, an integral configuration of armature, valve closing body and valve tappet or a different partition of the housing and the like are also conceivable without departing from the scope of the main claim.

The present invention is not limited to embodiments described herein; reference should be had to the appended claims.

What is claimed is:

1. A valve device for a hydraulic circuit, the valve device comprising:
    an actuator unit comprising:
        an electromagnetic circuit comprising an armature configured to be movable,
        a core,
        a coil configured to be supplied with a current and a flux guiding means, and
        a space arranged in a valve interior between the armature and the core;
    a valve unit comprising:
        an outlet,
        an inlet arranged between the outlet and the space in the valve interior,
        a valve seat arranged between the inlet and the outlet, and a valve closing body directly connected with the armature, the valve closing body being configured so as to be spring-loaded towards the valve seat; and an opening arranged at an end of the valve unit opposite to the space, the opening comprising a valve tappet arranged therein, the valve tappet being configured to be pressure-loaded and displaceable counter to the valve closing body in an opening direction, wherein, the space is in a permanent fluidic communication with the outlet.

2. The valve device as recited in claim 1, further comprising:

a first force application surface arranged at the valve closing body, the first force application surface being configured to have a first pressure at the outlet act thereon; and a second force application surface arranged at the armature, the second force application surface being configured to have a second pressure in the space in the valve interior act thereon, wherein, the first force application surface corresponds to the second force application surface, and the space in the valve interior is configured to be in a fluid communication with the outlet.

3. The valve device as recited in claim 2, wherein the armature is formed integrally with the valve closing body.

4. The valve device as recited in claim 3, wherein the armature and the valve closing body comprise a longitudinal bore, and the fluid communication between the space in the valve interior and the outlet is provided via the longitudinal bore.

5. The valve device as recited in claim 1, wherein the valve tappet is formed integrally with the valve closing body.

6. The valve device as recited in claim 5, wherein an area between the valve tappet and the valve closing body defines an opening, and the longitudinal bore is in a fluid communication with the outlet via the opening.

7. The valve device as recited in claim 1, wherein the valve tappet is supported as a separate component in the valve unit.

8. The valve device as recited in claim 1, further comprising a bushing which is fastened in the opening of the valve unit, wherein the valve tappet is guided in the bushing.

9. The valve device as recited in claim 8, wherein the valve tappet comprises an extended portion at an end opposite to a pressure-loaded surface, the extended portion being configured, in a pressure-relieved condition, to bear axially upon the bushing.

10. The valve device as recited in claim 1, wherein the valve unit further comprises a housing, the valve seat is provided as a frustoconical configuration in the housing, and the valve closing body is provided as a cylindrical configuration.

11. The valve device as recited in claim 10, further comprising a bushing arranged in the housing, wherein the armature being configured to slide in the bushing.

12. The valve device as recited in claim 1, wherein the core comprises a radially outer portion comprising a thread, and a radially inner portion which is configured to be displaceable via the thread.

13. An oil pump regulating arrangement comprising:

a valve device comprising:

an actuator unit comprising:

an electromagnetic circuit comprising an armature configured to be movable, a core, a coil configured to be supplied with a current and a flux guiding means, and a space arranged in a valve interior between the armature and the core;

a valve unit comprising:

an outlet, an inlet arranged between the outlet and the space in the valve interior, a valve seat arranged between the inlet and the outlet, and a valve closing body directly connected with the armature, the valve closing body being configured so as to be spring-loaded towards the valve seat; and an opening arranged at an end of the valve unit opposite to the space, the opening comprising a valve tappet arranged therein, the valve tappet being configured to be pressure-loaded and displaceable counter to the valve closing body in an opening direction; and a variable oil pump comprising:

a control chamber, and an oil sump, wherein, a feed pressure of the variable oil pump is applied to the valve tappet, and the space is in a permanent fluidic communication with the outlet.

14. The oil pump regulating arrangement as recited in claim 13, wherein the variable oil pump further comprises an orifice and a feed line, wherein the control chamber of the variable oil pump is connected with the feed line of the oil pump via the orifice.

15. The oil pump regulating arrangement as recited in claim 13, wherein the outlet of the valve unit is in a fluid communication with the oil sump.

* * * * *